Oct. 29, 1963  H. S. LEWIS ETAL  3,109,074
CYCLICALLY OPERATED SWITCH CONTROL APPARATUS
Filed May 12, 1961
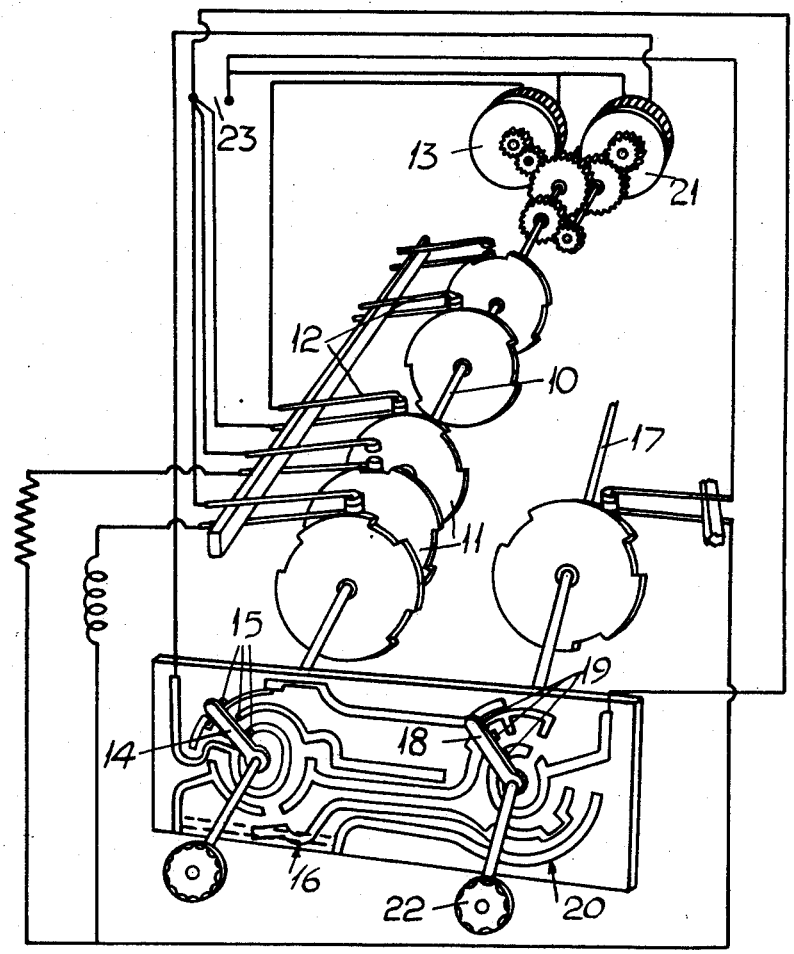

United States Patent Office 3,109,074
Patented Oct. 29, 1963

3,109,074
CYCLICALLY OPERATED SWITCH CONTROL
APPARATUS
Harry Stanley Lewis and Francis McGuirk, Birmingham,
England, assignors to Chamberlain & Hookham Limited, Birmingham, England
Filed May 12, 1961, Ser. No. 109,630
2 Claims. (Cl. 200—38)

This invention relates to cyclically operated control apparatus having a plurality of switches which are operated by a plurality of rotatable cams, said cams being mounted on a shaft which is adapted to be driven by power-operated means.

The object of the present invention is to provide a new or improved arrangement in which the speed of rotation of the cam-carrying shaft can be varied in a simple and convenient manner in accordance with the requirements of the user.

In accordance with the invention there is provided switch control apparatus comprising in combination a first shaft carrying a plurality of cams rotatable with said first shaft and adapted to operate a plurality of switches, means for driving said first shaft, electrically operated means for varying the speed of rotation of said first shaft, a first set of brushes mounted on the first shaft or for rotation therewith, a second shaft carrying a second set of brushes, and a plurality of electrical conductors associated with each set of brushes, one at least of the conductors associated with the first set of brushes being electrically connected to said speed varying means and the conductors associated with the two sets of brushes being interconnected and arranged so that an electric current picked up by the second set of brushes from the conductors associated therewith will be transmitted to the first set of brushes at one or more predetermined angular positions or over one or more predetermined arcs of movement of the latter, depending upon the position of the second set of brushes relative to the conductors associated therewith, so as thereby to transmit current via said first set of brushes and the conductors associated therewith to said speed varying means to energise the latter.

The invention will now be more particularly described with reference to the accompanying drawing which shows schematically one example of apparatus in accordance with the present invention.

In the example shown in the drawing, the apparatus is used to control the cycle of operations of a domestic washing machine. It is, however, to be understood that the apparatus may be adapted for use to control the cycle of operations of other machines.

In the example now described the apparatus is provided with a first shaft 10 which carries a plurality of disc-like cams 11 which are arranged to engage at their peripheries with a plurality of associated electric switches 12. The switches themselves are used to control the various parts of the washing machine and the operation thereof. For example, said switches 12 may control the speed of rotation of a washing drum, the supply and draining of washing water and the temperature of such water. The aforementioned first shaft 10 is connected to an electric motor 13 whereby it may be rotated and the connection between the shaft and the motor may be direct or alternatively a ratchet drive may be provided. The electric motor 13 is arranged, therefore, to rotate said first shaft 10 at a predetermined constant speed so as to provide a normal cycle of operations. Said first shaft 10 is also provided with an arm 14 carrying a set of brushes 15 which are radially spaced with respect to each other and which are rotatable with the first shaft so as to be engageable with an associated set of conductors arranged around the shaft and generally indicated by reference numeral 16.

There is also provided a second shaft 17 which is arranged in a spaced parallel relationship relative to the first shaft 10 and said second shaft also carries an arm 18 having a plurality of brushes 19 rotatable with the shaft. Said brushes 19 are engageable with a plurality of conductors 20 associated with the second shaft and extending round it and some at least of the conductors 20 are electrically connected to the conductors 16 associated with the first shaft.

There is further provided speed changing means in the form of an auxiliary motor 21 which is also connected to the first shaft 10 so that when it is put into operation the speed of rotation of said first shaft will be changed from its normal value. The usual arrangement would be for the auxiliary motor 21 to increase the speed of rotation of said first shaft so that a part of the normal cycle of operations can be dispensed with or the time taken to go through such part can be reduced. In alternative constructions such alteration in the normal speed of rotation of the first shaft can be effected by means other than an auxiliary motor. For example, a different gear ratio (changed by some electrically operated device) may be employed or the circuit arrangement of the driving motor 13 can be altered.

The set of brushes 19 rotatable with the second shaft is connected to a selector switch 22 operable by the user of the machine and the arrangement is such that at any given setting of said selector switch 22 current fed to the conductors 20 from a source 23 will be transmitted via the brushes 19 and those conductors connected to the conductors 16 associated with the first shaft to the first set of brushes 15 so that current can then be fed to the auxiliary motor 21 via the innermost of said conductors 16 at a predetermined time or times depending on the angular position of said set of brushes 15 as they rotate with the first shaft. Thus the second set of brushes 19 will be set by the operator at a fixed position dependent upon which part of the normal cycle it is desired to dispense with. As the set of brushes 15 rotates with the first shaft 10 said brushes will pick up current over a given arc of movement or at a given angular position so that the auxiliary motor 21 is energised and the cycle of operations altered as required.

Instead of providing a manually operable selector switch for the second set of brushes 19 said brushes may be positioned by remote control means. For example, there may be provided a homing motor operable by a series of push-buttons for driving said set of brushes 19 to the desired position.

Having thus described our invention what we claim as new and desire to secure by Letters Patent is:

1. Switch control apparatus comprising in combination a first rotatable shaft, a plurality of cams rigidly mounted in axially spaced relationship on said first shaft so as to be rotatable therewith for operating a plurality of switches, power-operable means connected to said first shaft for imparting rotation thereto, electrically operable means for varying the speed of rotation of said first shaft, a first set of brushes mounted on said first shaft for rotation therewith, a first plurality of electrical conductors with which said first set of brushes are contactable during rotation of said first shaft, and at least one of which is electrically connected to said electrically operable means, a second rotatable shaft, a second set of brushes mounted on said second shaft, a second plurality of electrical conductors with which said second set of brushes are contactable during rotational movement of said second shaft, and to which electric current is suppliable under the control of said second set of brushes, at least some of said second plurality of electrical conductors being electrically connected to at least some of said first plurality of electrical conductors so that when said second set of brushes occupy predetermined positions relative to said second plurality of electrical conductors, and said first set of brushes reach predetermined positions relative to said first plurality of electrical conductors, the two sets of brushes enable electric current to flow through the electrically interconnected conductors to said electrically operable means for enabling the latter to vary the speed of rotation of said first shaft.

2. Switch control means according to claim 1, wherein the power-operable means for imparting rotation to said first shaft comprises an electric motor, and said electrically operable means for varying the speed of rotation of said first shaft comprises a second electric motor connected to said first shaft.

References Cited in the file of this patent

UNITED STATES PATENTS

| | | |
|---|---|---|
| 2,794,081 | Luhn | May 28, 1957 |
| 2,961,500 | Clarke et al. | Nov. 22, 1960 |